Oct. 27, 1942.    W. W. URMETZ    2,300,077
WIPER STRIP
Filed July 10, 1941
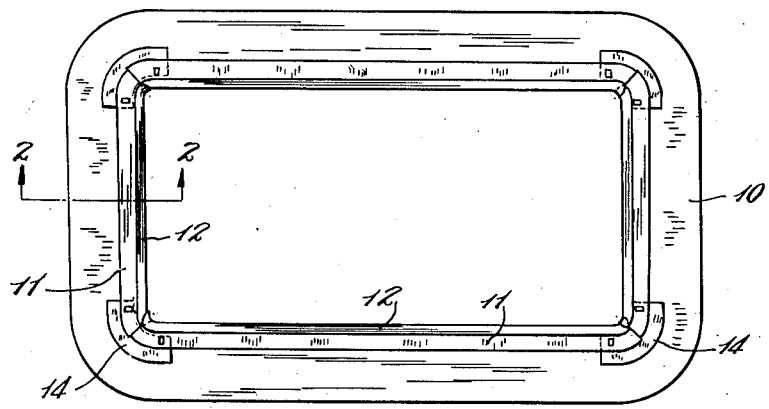
Fig. 1
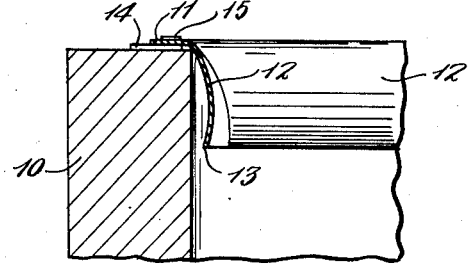
Fig. 2
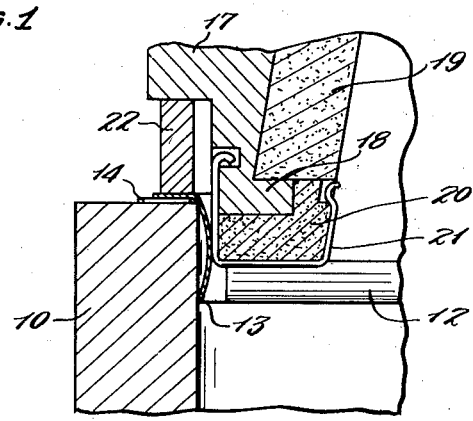
Fig. 3
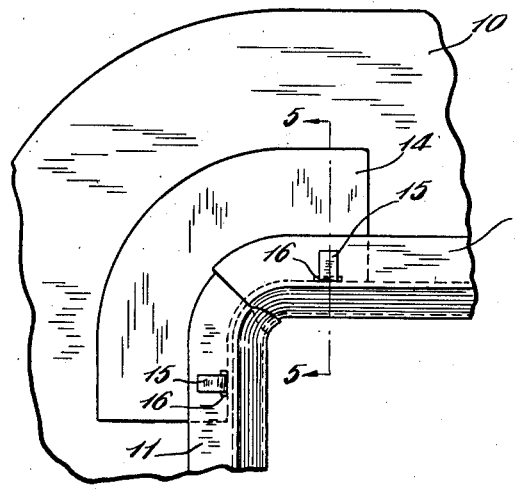
Fig. 4
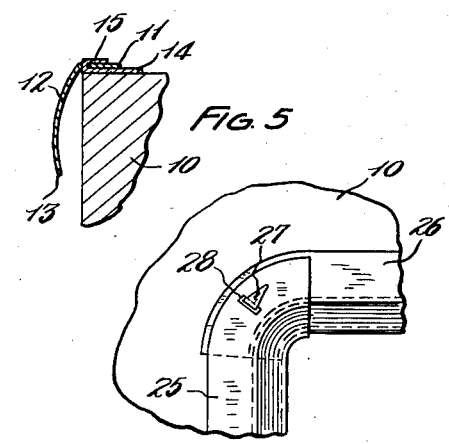
Fig. 5
Fig. 6
INVENTOR.
WALTER W. URMETZ
BY Kwis Hudson & Kent
ATTORNEYS Patented Oct. 27, 1942

2,300,077

UNITED STATES PATENT OFFICE 2,300,077

WIPER STRIP

Walter W. Urmetz, Parma, Ohio, assignor to The Ferro Engineering Company, Cleveland, Ohio, a corporation of Ohio Application July 10, 1941, Serial No. 401,750

3 Claims. (Cl. 22—147)

This invention relates to improvements in wiper strips. It has to do with means for sealing the joint between the inner wall of an ingot mold and the bottom of a hot top projecting downwardly into the mold. In one conventional construction illustrated for example in Patent No. 1,804,207 to Walter M. Charman et al., dated May 5, 1931, the wiper strip, carried by the hot top near the bottom thereof, has an upwardly inclined rim which wipes against the inner wall of the mold as the hot top is lowered thereinto. In accordance with the present invention, on the other hand, the wiper strip is carried upon the mold, being an annulus which is put in place before the hot top is inserted into the mold, and the wiper strip engages and wipes against the lower outer corners of the hot top as the latter is lowered into position in the mold.

One of the objects of the invention is the provision of a resilient metal wiper strip which is adapted to be carried by the mold rather than by the hot top and which effectively seals the joint.

Another object is the provision of a wiper strip which will eliminate the fin of metal at the upper edge of the ingot formed by the conventional wiper strips heretofore employed.

Other objects and features of novelty will appear as I proceed with the description of that embodiment of the invention which, for the purposes of the present application, I have illustrated in the accompanying drawing, in which Fig. 1 is a plan view of a rectangular mold with my wiper strip in place thereon.

Fig. 2 is a cross-sectional view on a larger scale, the section being taken substantially on the line 2—2 of Fig. 1.

Fig. 3 is a view similar to Fig. 2 but showing a hot top in place in the mold and the wiper strip flexed accordingly.

Fig. 4 is a fragmental plan view on a larger scale illustrating a corner joint between sections of a wiper strip.

Fig. 5 is a vertical sectional view taken substantially on the line 5—5 of Fig. 4, and Fig. 6 is a fragmental plan view of another form of joint between wiper strip sections.

In the drawing 10 represents an ingot mold illustrated as rectangular with straight inner walls. The invention is equally applicable, however, to round molds and to molds with fluted walls, the present form being shown merely by way of example. The top surface of the mold is flat.

The wiper strip of the present invention may be said to be an annulus if that term be construed broadly enough to apply to closed loops of a shape other than circular. The wiper strip could be cut or stamped from a single piece of resilient sheet metal, but as that procedure would be wasteful of material I make the annulus of two or more sections. When the mold is circular, I prefer to employ three sections, each covering 120° of arc, while for rectangular molds of moderate size I prefer to employ four sections as illustrated in the accompanying drawing.

Each section comprises a flat flange 11 adapted to rest upon the flat upper surface of the mold and a bowed portion 12 depending into the mold and so shaped that its lower edge normally stands away from the inner wall surface of the mold, as indicated in Fig. 2, that is before the hot top is inserted.

As shown herein the joints between the sections are located at the corners of the annulus. In accordance with the form of Figs. 1 to 5, inclusive, the flanges 11 are mitered at the joints and the sections at each joint are held together by a junction plate 14 which extends beneath the flanges 11 and has lips 15 that are caused to extend through slots 16 in flanges 11 and are then bent down into close engagement with the flanges 11. The bowed portions 12 depending into the mold overlap sufficiently to prevent the joint opening up when the hot top is inserted and causes these portions to be deflected outwardly.

The wiper strip is shipped knocked down, and the sections are put together and fastened with the plates 14 at the mill. This, of course, is easily and quickly performed by unskilled labor by the use of a suitable jig constructed for the purpose. A supply of these annular wiper strips being made up, when the mold is prepared for pouring an annulus is merely dropped into place on the mold where it rests by virtue of the flanges 11, being accurately centered because of its exact fit.

In Fig. 3 I have shown a fragment of a composite hot top positioned in the mold with the bowed portion 12 of the wiper strip deflected outwardly and its lower edge 13 resting against the mold wall. A metal casing 17 provided with a lower ledge 18 supports upper lining blocks 19 and a bottom ring 20 is attached to the casing and covers and protects the lower edges of the blocks 19. The ring 20, made of suitable refractory material is preferably hung from the casing by means of a series of wire clips 21 in the manner disclosed in Charman Patent 2,080,848, except that in this instance the outer wall of the casing and the outer wall of the ring are recessed in order that the clip 21 may stand flush with the outer surface of these elements and not interfere with the desired smooth contact between the wiper strip and the ring 20.

When the hot top is assembled onto the mold it is temporarily supported by wooden blocks or the like 22 of a selected height such that the bottom surface of the hot top intersects the wiper strip at a point substantially coincident with the innermost part of the bow of that strip. Some small latitude as to the height of the lower surface of the hot top is permissible, but it is important that the hot top extend downwardly no further substantially than the position illustrated in Fig. 3, as otherwise a small fin would be formed upon the ingot at this juncture, and it is one of the objects of the invention to eliminate such a fin for the reason that fins in this position become elongated during the rolling out of the ingot and make it difficult to determine the proper point for cropping off the sink head. Furthermore, such fins sometimes damage the smooth surfaces of the rolls.

When the metal has been poured and has become chilled slightly adjacent the mold walls and the exposed portions of the wiper strip, the blocks 22 may be knocked out, leaving the hot top free to float and descend slightly with the shrinkage of the metal during the cooling of the ingot. It will be understood that the bowed portion 12 of the wiper strip is so formed and dimensioned that, as the hot top is lowered into position, the lower outer corners thereof engage the wiper strip sections and force them outwardly with the result that the lower edges 13 engage the mold walls with considerable force and ride down slightly, forming a good seal. Of course, when the hot metal strikes the strip sections they melt or merge into the ingot, but in that instant there is sufficient chilling of the outer shell of the ingot to prevent any flow upwardly behind the wiper strip and a nice bevel is formed on the ingot conforming to the outline of the wiper strip below the level of the hot top.

In Fig. 6 I have illustrated a modification of the joint at a corner of the wiper strip wherein two sections 25 and 26 of the strip have overlapping portions above the top surface of the mold as well as within the mold, the section 26 having a lip 27 struck upwardly therefrom and the section 25 having a slot 28 therein to receive the lip 27 which is thereafter bent down tightly to make a secure connection.

Having thus described my invention, I claim:

1. In combination with an ingot mold and a hot top inserted into the mold, a wiper strip in the form of a resilient annulus supported upon the upper surface of the mold and depending into the mold, the depending portion being bowed inwardly in cross section for contact with the hot top and having its lower edge contacting the mold wall.

2. In combination with an ingot mold and a hot top inserted thereinto, a metallic wiper strip in the form of a resilient annulus supported upon the upper surface of the mold and depending into the mold, said depending portion being bowed inwardly in cross section and said hot top being supported at a level such that its lower outer corner contacts the wiper strip approximately at the innermost point of the bow thereof and forces the lower edge of the strip into sealing contact with the mold wall.

3. In combination with an ingot mold and a hot top inserted into the mold, a wiper strip in the form of a resilient sheet metal annulus having a flange engaging the upper surface of the mold and having an inwardly bowed portion depending into the mold, said bowed portion engaging the lower outer corner of the hot top and the lower edge of the strip being forced by the hot top into sealing contact with the mold wall.

WALTER W. URMETZ.